Figure 1:
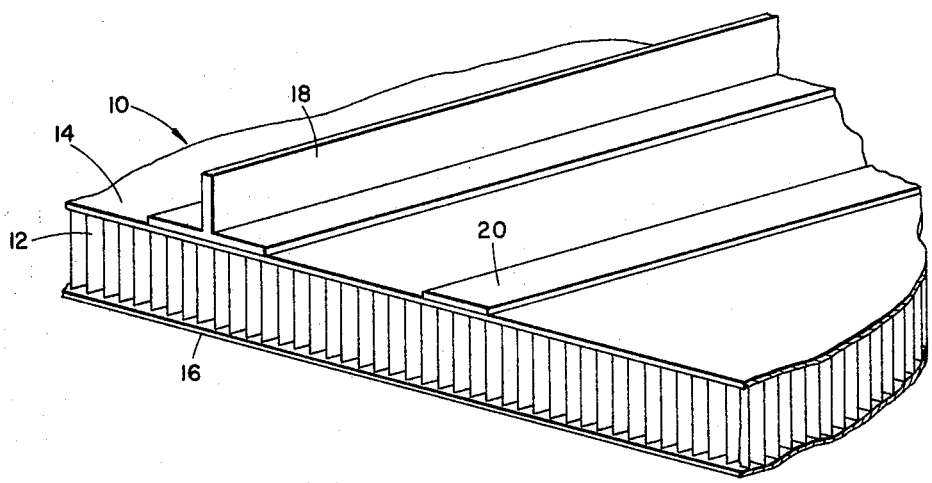

Aug. 9, 1966    M. M. MABRY ETAL    3,264,728
BRAZING METHOD
Filed June 22, 1965

INVENTORS
MILTON M. MABRY
BY MARTIN PERL
CARL J. MUSER
ATTORNEY

United States Patent Office

3,264,728
Patented August 9, 1966

1

3,264,728
BRAZING METHOD
Milton M. Mabry, Torrance, Martin Perl, Los Angeles, and Carl J. Muser, Rolling Hills Estates, Calif., assignors to North American Aviation, Inc.
Substituted for abandoned application Ser. No. 158,718, Dec. 12, 1961. This application June 22, 1965, Ser. No. 472,384
2 Claims. (Cl. 29—471.1)

This application is a substitute for abandoned application Serial No. 158,718, filed Dec. 12, 1961.

This invention relates to alloys and techniques for brazing together two or more metallic members. More particularly, this invention concerns brazing alloys for use with precipitation hardenable stainless steel structures in which various of the brazed joints on a single workpiece are subjected to different service demands or environments.

Although the invention is of wide applicability in forming a variety of diverse joints or connections between elements of different forms and materials, it will be described for the sake of illustration in connection with fabrication of aircraft and high speed aerial or space vehicles. It will be understood that the scope of the inventive concept is in no sense limited by any of the specific details used to explain the invention, except as determined by reference to the accompanying claims.

Modern aerial and space vehicles are characterized by extremely severe operating conditions requiring fabrication techniques and materials unknown in conventional supersonic aircraft. Structure used in vehicles of the stated type must be capable of withstanding the extreme temperatures and stresses encountered during operation of the vehicle. For example, a single metallic lamina such as formerly used for outer skin surfaces in aircraft construction is no longer adequate, and reinforced skin surfaces of honeycomb sandwich panel type are necessary. In making such panels, slabs of honeycomb core material of thin metal foil are accurately cut to produce the necessary variation in core thickness throughout the section, and are thereafter brazed to sheet metal top and bottom panel face sheets having a thickness as little as .010 inch.

Lightweight panels such as described above are used extensively to form the external surfaces of modern aerial and space vehicles, the separate panel sections being joined together along their adjacent edges to form such surfaces. Where braces are required to be attached to such panels for the support of adjacent structure or for local reinforcement in highly stressed panel locations, the brazing alloy is required to provide a joint of great strength inasmuch as the panels form primary vehicle structure.

Brazing of extremely thin gauge sheet metal such as described above presents formidable problems not heretofore encountered in industry. As in brazing generally, the workpiece components are heated to the liquidus temperature of the brazing alloy, and brazing heat therefore permeates the base metal surrounding the braze area. Changes such as expansion and shrinkage of the area affected by brazing heat normally result from the brazing operation, as well as changes in physical properties such as strength and ductility. Moreover, metallurgical effects such as recrystallization and heat treatment occur due to the application of brazing heat. These adverse effects are particularly aggravated in the case of workpieces having low mass such as the panels described above, or non-uniform mass distribution throughout the workpiece.

Moreover, the brazing problem described above is additionally complicated by the fact that new materials and alloys not heretofore known in the manufacture of conventional supersonic vehicles are used in the panel sections referred to above. Notable among such materials are the so-called advanced alloys of precipitation hardenable stainless steel, of which the alloy designated as PH15–7Mo is illustrative. The component elements and general range of percentage composition by weight for PH15–7Mo is as follows:

| | | |
|---|---|---|
| Carbon | percent maximum | .09 |
| Manganese | do | 1.00 |
| Phosphorous | do | .04 |
| Sulphur | do | .03 |
| Silicon | do | 1.00 |
| Chromium | percent | 14.00 to 16.00 |
| Nickel | do | 6.5 to 7.5 |
| Molybdenum | do | 2.00 to 3.00 |
| Aluminum | do | .75 to 1.5 |
| Iron | | Balance |

While the stated precipitation hardenable alloys including PH15–7Mo provide great strength at extreme environmental temperatures, such materials are characterized by a reduction in strength when heated excessively. Thus, for example, during a brazing operation to joint workpiece materials of precipitation hardenable stainless steel in the hardened condition, the application of heat in an amount sufficient to melt the brazing alloy may cause annealing and consequent weaking of the base metal in the absence of preventive measures.

Since the honeycomb core material as used in the fabrication of stainless steel panels such as described above is of .001 inch thickness or less, silver base brazing alloys are used for brazing of the core material to the upper and lower panel face sheets. Such alloys are characterized by a propensity for adhering to the surface of the components which they contact in the finished joint, rather than diffusing into the base metal in the manner identified with so-called aggressive brazing alloys. Diffusion of brazing alloy into honeycomb core material is avoided due to the weakening effects normally identified with such diffusion workpieces of extreme thinness. However, conventional silver base alloys are characterized by severe degradation of properties in the environment associated with certain operating conditions for vehicles of the type described above. Thus, honeycomb panels of the stated type are required to retain considerable strength at prolonged surface temperatures of 630° F., or more, and atmospheric conditions capable of producing accelerated oxidation and other corrosive effects on panel materials. Therefore, brazing alloy of vastly different type than the conventional silver base alloy discussed above is necessary for use in external attachments. However, due to use of a novel fabrication technique disclosed hereinbelow, the stated alloy for external use is required to braze at precisely the same temperatures used for brazing of honeycomb core material to face sheets using silver base brazing alloy. Also, the external brazing alloy is required to possess superior oxidation resistance characteristics at elevated temperatures as well as retaining its strength at such temperatures. In addition, the stated brazing alloy for external panel attachment is required to be adaptable for reasonably economic commercial use and modern mass production technique, besides affording low thermal conductivity so that skin surface temperatures will not be transmitted to the internal vehicle compartments. Also, use of the external brazing alloy in foil form is necessary in joining faying surfaces between workpiece components of the stated nature, whereas many known types of brazing alloy are too brittle to be formed in sections of the required thinness. To date, no known brazing alloy has proven successful in combining each of the stated desired properties and results until discovery of the invention disclosed herein.

Accordingly, it is a principal object of the invention disclosed herein to provide a brazing alloy characterized by improved strength at high temperatures.

It is a further object of the invention in this case to provide brazing alloy characterized by improved resistance to oxidation.

It is also an object in this case to provide an improved brazing alloy having low thermal conductivity.

It is an additional object in this case to provide a workpiece assembly in which a plurality of brazed joints in close proximity to each other may be accomplished using materially different brazing alloys in various of the stated joints.

It is another object of this invention to provide an improved brazing alloy in accordance with the other objects set forth herein adapted for simultaneous brazing with conventional silver base alloys.

Figure 2:
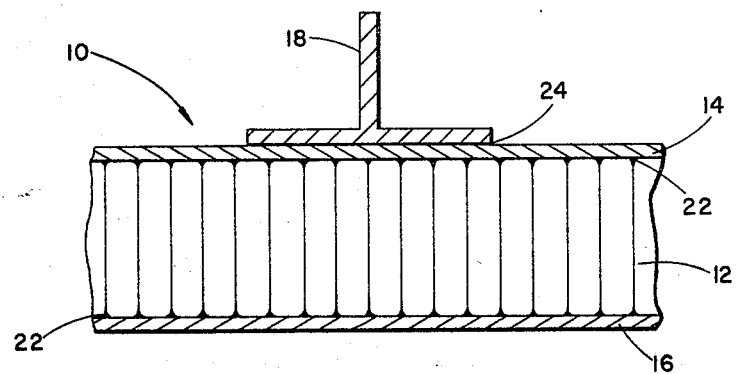

Other objects and advantages will become apparent upon a close reading of the following detailed description of an illustrative embodiment of the inventive concept, reference being had to the accompanying drawings, wherein:

FIG. 1 shows a general perspective view of a workpiece illustratively incorporating the inventive concept disclosed herein, and FIG. 2 shows an isolated fragmentary view in cross section taken laterally through a portion of the workpiece shown in FIG. 1.

Brazing alloys known to those skilled in the art and compatible with precipitation hardenable stainless steel comprise two broad classes which may be termed silver base alloys and copper base alloys. The former group includes the alloy commercialy known as sterling-lithium and having a general composition of 92.3% silver, 7.5% copper, and 0.2% lithium, the liquidus temperature of which is on the order of 1625° F. In brazing extremely thin metallic components such as honeycomb foil of .001 inch thickness, the stated alloy has been found more acceptable than the copper base alloys, primarily due to the fact that sterling-lithium brazing alloy is relatively passive whereas copper base alloys are generally aggressive whereby they diffuse completely through the foil and produce inherently weak core to face sheet joints in the problem situation discussed above.

However, stainless steel panels such as described above for use in external skin surfaces of aerial vehicles and missiles involve the function of containing fuel or electronic and other temperature sensitive items which are required to be thermally insulated from the elevated vehicle surface temperatures occurring during normal operation at high speed. Honeycomb panels brazed with sterling-lithium brazing alloy such as described above do not provide satisfactory insulation, particularly due to the high thermal conductivity of the brazing alloy in the joint between the honeycomb core and the panel face sheets. Therefore, a low thermal conductivity alloy, hereinafter called the improved silver base alloy, was developed to provide the necessary strength and other characteristics at high temperature combined with low thermal conductance for use in brazing such joints. An illustrative composition of the improved silver base alloy is 84.6% silver, 7.5% copper, 5.5% indium, 2.2% palladium and 0.2% lithium, although advantageous results are obtained within a certain narrow range of variations in the stated composition. When used in brazing honeycomb panels of PH15–7Mo steel, no diffusion of the stated improving brazing alloy into the core material was encountered. The addition of indium to the sterling-lithium brazing alloy lowers the thermal conductivity of the brazing alloy, while palladium increases the brazing temperature, and lithium enhances the flow and wetting characteristics of the alloy in liquid form. To control capillarity and flow characteristics in the improved alloy during the brazing operation, a mechanical mixture of nickel with the stated alloy is formed in the proportion of 80% brazing alloy and 20% nickel by volume. The liquidus of the stated mixture is within the range from 1705–1745° F. whereby use of the mixture in connection with the novel technique disclosed herein is permitted.

Due to the fact that silver base alloys including the improved alloy described above lose their strength, their dimensional accuracy, and suffer other deterioration in an oxidizing environment particularly at elevated temperatures, silver base alloys are unsuitable for use on panel surfaces exposed to such environment during normal operation of an aerial or space vehicle involving use of such panels. Thus, silver base alloys are appropriate for joinder of honeycomb core material to panel face sheets within panels of the stated type inasmuch as each individual cell forms a closed chamber in which the oxidizing effects of atmosphere outside the panel are completely excluded. However, braces and other attachments on the panel exterior require the use of high strength brazing alloys capable of resisting oxidation during prolonged exposure to atmospheric environment at extremely high temperatures. Therefore, use of the novel oxidation resistant brazing alloy disclosed herein is necessitated by the particularly severe operating conditions to which such attachments are exposed.

Briefly stated, the novel brazing alloy which fulfills the requirement of the external panel joint discussed above is in essence a manganese base alloy, the characteristics of which are particularly sensitive to relatively slight variations in percentage composition, and the quality of which is necessarily controlled within rather narrow margins. Thus, the alloy comprises three constituent elements forming a solid solution having about from 40 to 50% copper, about from 10–14% nickel and the balance essentially manganese. While advantageous results may be obtained from the brazing alloy constituted by the combination of these three constituents in various amounts within the stated ranges, optimum quantities in the brazing alloy as best suited for the particular requirements of panel fabrication and use discussed above have been found to result from the combination of about 45% copper, about 12% nickel and about 43% manganese. The resultant brazing alloy has a high strength at elevated temperatures combined with good oxidation resistance and low thermal conductivity as required in panels used in the fabrication of high speed vehicles. The salt spray and cyclic humidity testing of samples brazed with the novel manganese base alloy disclosed herein has shown it to possess superior strength in the stated types of environment compared with other compositions of manganese base brazing alloy. In addition, considerable savings in the cost of brazing large panel assemblies result from use of the manganese base alloy disclosed herein, and substantial savings of weight in the finished joint, affording a very useful advantage in connection with aerial vehicle design. The brazing temperature of the preferred alloy described above, within a relatively narrow tolerance range such as ±20° F., is 1725° F., which closely coincides with the liquidus temperature of the silver base alloy used in forming the brazed joint between honeycomb core material and panel face sheets.

Due to the various considerations discussed above relative to distortion, annealing, weakening and other adverse effects of brazing heat on advanced stainless steel alloys in the hardened condition, particularly in workpieces of extremely thin-walled construction, it has been found unfeasible to braze external panel attachments to panels in which the core material has previously been completely brazed to the face sheets. Therefore, a novel technique was devised to produce panels having such attachments as shown in FIGS. 1 and 2. In the novel method, braces, doublers and other external attachments are joined to panel face sheets simultaneously with the brazing of internal core to the stated sheets during fabrication of the entire panel unit. Thus, honeycomb core material is brazed to panel face sheets at the same time that workpiece components are brazed to the same face sheets and externally thereof. Simultaneous brazing of the silver base alloy and manganese base alloy described above to form a single unitary panel assembly by a single heating step is permitted by the alloy characteristics which result from the precise composition described above in respect of each.

Thus, for example, a workpiece 10 shown in FIG. 1 comprises a core section 12 joined to face sheets 14 and 16 on either side thereof. Externally of face sheet 14, a brace in the form of T-section channel member 18 is secured to the panel, while a reinforcing doubler 20 is similarly secured.

Referring to FIG. 2, improved silver-base alloy 22 is shown in position between core 12 and face sheets 14 and 16, while manganese base alloy 24 is shown between face sheet 14 and brace or channel member 18.

From the description set forth above, it may be seen that the invention disclosed herein permits brazing of extremely thin gauge sheet metal in complex workpieces in a single operation involving a minimum of exposure of the workpiece to brazing heat, with the result that expansion and shrinkage or other distorting influences are materially reduced. Thus, lightweight panels of the type discussed above may be fabricated by a single brazing operation although the workpiece components involve a plurality of brazed joints using materially different brazing alloys suitable for the environmental conditions to which the various joints are separately subjected. Application of the technique described herein in fabricating lightweight panels provides improved structural joints characterized by greater strength and substantially less distortion than was heretofore possible in brazing workpieces of such thin-walled construction. The teachings set forth herein are particularly applicable to workpiece materials exhibiting a severe sensitivity to residual stresses and shrinkage effects, such as precipitation hardened steels. The brazing alloys disclosed herein are particularly applicable to fabrication of items required to meet standards for performance and testing as contained in military specifications, such as environmental and load testing. In this connection, the manganese base alloy described above was shown to be materially stronger in corrosive conditions of use than any comparable alloy.

While the particular details set forth above and in the drawings are fully capable of attaining the objects and providing the advantages herein stated, the structure and procedure thus disclosed are merely illustrative and could be varied or modified to produce the same results without departing from the scope of the inventive concept as defined in the appended claims.

We claim:

1. A method of joining together workpiece components to form a stainless steel panel of sandwich type construction having relatively low density core with a relatively higher density face sheet secured on either side of said core, said panel further having at least one external member secured to one of said face sheets on the side thereof opposite from the connection between said core material and said one face sheet, said method comprising:

positioning between said core and each of said face sheets a silver base brazing alloy adapted to liquify at a brazing temperature, positioning between said one face sheet and said external member a manganese base brazing alloy adapted to liquify at said brazing temperature, and simultaneously heating said panel, said member, and both said brazing alloys to cause said alloys to form permanent joints.

2. The method set forth in claim 1 above, wherein:

said silver base alloy contains from about 80 to 90% silver, from about 5 to 10% copper, from about 0.1 to 0.3% lithium, from about 3 to 7% indium, and from about 1 to 4% palladium, and said manganese base alloy contains from about 40 to 50% copper, from about 10 to 15% nickel, and the balance essentially manganese.

References Cited by the Examiner
UNITED STATES PATENTS

| | | | |
|---|---|---|---|
| 2,713,196 | 7/1955 | Brown | 29—472.3 X |
| 2,966,738 | 1/1961 | Bertossa | 29—494 X |
| 3,005,258 | 10/1961 | Sangdahl et al. | 29—494 |
| 3,131,470 | 5/1964 | Waller | 29—471.1 |

JOHN F. CAMPBELL, *Primary Examiner.*